US009726267B2

(12) United States Patent
Range et al.

(10) Patent No.: US 9,726,267 B2
(45) Date of Patent: Aug. 8, 2017

(54) RELATIVE TRANSLATION SYSTEM

(71) Applicant: Raytheon Company, Waltham, MA (US)

(72) Inventors: Jake B. Range, McKinney, TX (US); Kirk A. Miller, Dallas, TX (US); David B. Peck, Plano, TX (US)

(73) Assignee: Raytheon Company, Waltham, MA (US)

( * ) Notice: Subject to any disclaimer, the term of this patent is extended or adjusted under 35 U.S.C. 154(b) by 116 days.

(21) Appl. No.: 14/446,079

(22) Filed: Jul. 29, 2014

(65) Prior Publication Data

US 2016/0033017 A1 Feb. 4, 2016

(51) Int. Cl.

| | |
|---|---|
| ***F16H 25/20*** | (2006.01) |
| ***G02B 7/00*** | (2006.01) |
| ***G02B 7/08*** | (2006.01) |
| *G03B 15/00* | (2006.01) |

(52) U.S. Cl.

CPC ......... *F16H 25/2003* (2013.01); *F16H 25/20* (2013.01); *G02B 7/08* (2013.01); *F16H 2025/2096* (2013.01); *G03B 15/006* (2013.01)

(58) Field of Classification Search

CPC ...... F16H 25/20; F16H 20/2003; F16H 25/24; F16H 2025/2445; F16C 19/52; F16C 23/06; F16C 25/06; F16C 25/083; G03B 15/006

USPC ....... 74/89.23, 89.42, 424.71, 89.36, 424.72, 74/89.27, 89.32, 89.33; 359/196.1, 359/197.1–199.1, 199.4, 200.1, 200.8, 359/221.2, 221.3, 698, 823, 209.1, 210.1, 359/694, 696, 813, 826

See application file for complete search history.

(56) References Cited

U.S. PATENT DOCUMENTS

| | | | | |
|---|---|---|---|---|
| 3,968,705 A * | 7/1976 | Amano | .................. | B23Q 11/04 408/11 |
| 4,415,941 A | 11/1983 | Gibeau et al. | | |
| 4,438,986 A * | 3/1984 | Teramachi | ............... | B23Q 5/40 384/43 |

(Continued)

FOREIGN PATENT DOCUMENTS

| | | |
|---|---|---|
| DE | 4411516 A1 | 10/1995 |
| EP | 1959296 A1 | 8/2008 |

(Continued)

OTHER PUBLICATIONS

International Search Report for International Application No. PCT/US2015/033373 dated Nov. 16, 2015, 6 pages, Netherlands.

*Primary Examiner* — William Kelleher
*Assistant Examiner* — Bobby Rushing, Jr.

(57) ABSTRACT

A relative translation system is disclosed. The relative translation system can include a relative translation assembly and a drive mechanism. The relative translation assembly can have a fixed support member, a translatable member supported by the fixed support member, and a translation guide portion to facilitate translation of the translatable member relative to the fixed support member. The translation guide portion can have a fixed translation member and a movable translation member. The movable translation member can be configured to maintain preload on the fixed and movable translation members and accommodate thermal expansion. The drive mechanism can be configured to cause translation of the translatable member relative to the fixed support member.

17 Claims, 4 Drawing Sheets

100 101 132b 132a 130 131a 131b 102 110 120 103 104 130 133a 131b 121b 131a 130 121 132b 132a 122b 102 120 103 123 105 123b 133b 133a 134 130 136 135

(56) References Cited

U.S. PATENT DOCUMENTS 4,727,762 A * 3/1988 Hayashi ................ F16C 19/548 384/517
4,752,849 A 6/1988 Yoshida et al.
4,787,260 A 11/1988 Bailey
4,853,808 A 8/1989 Lutz
5,425,282 A * 6/1995 Luigs ..................... B23Q 1/262 108/143
5,448,438 A * 9/1995 Kasetty ............... F16H 25/2009 360/261.3
6,000,308 A * 12/1999 LaFountain ............. F16C 25/06 83/177
6,931,960 B1 * 8/2005 Devenyi ............. F16H 25/2295 74/424.77
7,706,089 B2 * 4/2010 Koc ....................... G02B 7/021 359/819
7,940,480 B2 * 5/2011 Huang ................ F16H 25/2006 359/694
7,966,900 B2 * 6/2011 Becker ................. B60N 2/0232 74/441
8,353,225 B2 * 1/2013 Mori ..................... F16C 29/004 384/43
8,564,715 B2 * 10/2013 Westerweck ......... G01D 5/3473 348/373
9,010,205 B2 * 4/2015 Schroeder ............... F16H 25/20 74/89.32
2003/0233896 A1 * 12/2003 Nagai ................. F16H 25/2204 74/89.23
2006/0139776 A1 * 6/2006 Mori ...................... G02B 7/026 359/819
2007/0295128 A1 * 12/2007 Erikson .................. D04B 21/04 74/89.42
2009/0205465 A1 8/2009 Shiga
2009/0277292 A1 * 11/2009 Quarre .................... F16H 25/24 74/89.23
2012/0314269 A1 * 12/2012 Takano .................. H02N 2/103 359/221.2
2013/0075189 A1 * 3/2013 Sekikawa ........... B62D 5/0409 180/444
2013/0277500 A1 10/2013 Miller
2014/0190291 A1 * 7/2014 Medina ................... B64C 13/28 74/89.23
2015/0240924 A1 * 8/2015 Lee ......................... F16H 25/24 74/89.36

FOREIGN PATENT DOCUMENTS

EP 2034343 A1 3/2009
FR EP 2665644 B1 * 6/2015 ............. B64C 13/28
WO WO 99/49241 A1 9/1999

* cited by examiner

RELATIVE TRANSLATION SYSTEM

BACKGROUND

Relative translation mechanisms are used in a wide variety of applications. For example, in an aircraft optical assembly, a focus cell may be configured to support and translate an optical element, such as a lens, to facilitate focusing electromagnetic radiation for an optical sensor. In this application, a linear slide table with a ball screw drive shaft is typically used to move the optical element relative to the optical sensor.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1B:
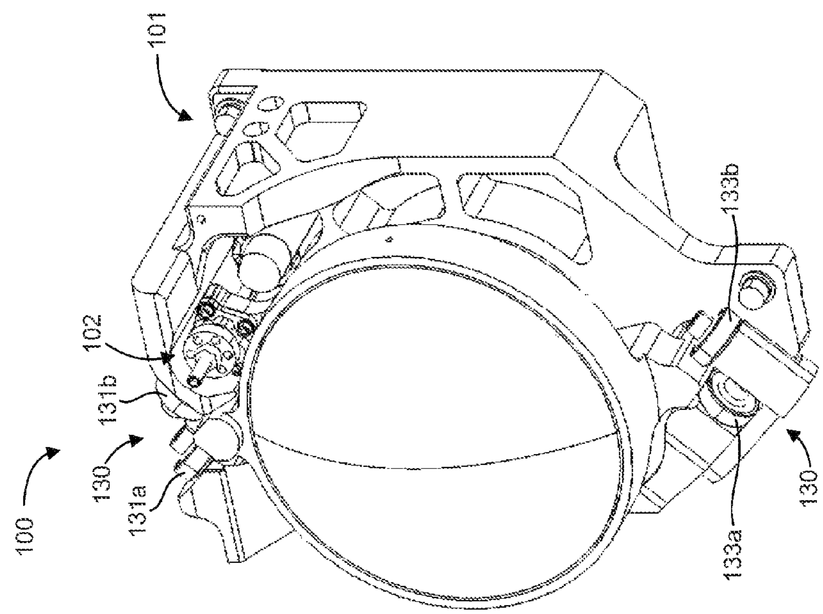
FIGS. 1A and 1B are example illustrations of a relative translation system in accordance with an example of the present disclosure.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Although linear slide tables have been successfully utilized in focus cells for some time, increased performance demands on optical systems is revealing the limits and weaknesses of the design. For example, existing linear slide table/ball screw focus cell designs are over-constrained by the slide table and ball screw. As a result, designers must accept the risk of increased friction and potential binding of the mechanism over runout tolerances and thermal expansion mismatches of the slide table and ball screw over an operating temperature range, incorporate extra clearance, or incorporate extremely tight tolerances in the design. Runout tolerances between the linear slide table and the drive axis can create runout binding, which can vary in severity across an operating temperature range due to thermal expansion, thereby affecting responsiveness and repeatability due to the changing friction. To account for runout binding, designs may either include oversized gaps, which results in less accurate alignment and "jitter" of the optical element, or very expensive, tight, machining tolerances. Thermal expansion can also cause "boresight drift" over a temperature range, which can negatively impact performance of the optical system, in addition, linear slide tables rely on a drive shaft to provide at least some structural support and may exhibit non-symmetric stiffness about the optical element, which can cause jitter of the optical element. Thus, focus cell performance can be enhanced by maintaining responsiveness and repeatability while minimizing boresight drift and jitter.

Accordingly, a relative translation system is disclosed that can compensate for runout tolerances, minimize negative thermal expansion effects, and symmetrical support an optical element. In one aspect, drive mechanism structures are decoupled from structurally supporting the optical element. The relative translation system can include a relative translation assembly and a drive mechanism. The relative translation assembly can have a fixed support member, a translatable member supported by the fixed support member, and a translation guide portion to facilitate translation of the translatable member relative to the fixed support member. The translation guide portion can have a fixed translation member and a movable translation member. The movable translation member can be configured to maintain preload on the fixed and movable translation members and accommodate thermal expansion. The drive mechanism can be configured to cause translation of the translatable member relative to the fixed support member.

A relative translation assembly is also disclosed. The relative translation assembly can include a fixed support member, a translatable member supported by the fixed support member, and a translation guide portion to facilitate translation of the translatable member relative to the fixed support member. The translation guide portion can have a fixed translation member and a movable translation member. The movable translation member can be configured to maintain preload on the fixed and movable translation members and accommodate thermal expansion.

In addition, a drive mechanism is disclosed. The drive mechanism can include a drive shaft having a threaded portion. The drive mechanism can also include a bearing to facilitate rotation of the drive shaft. The bearing can be configured to support the drive shaft and interface with a first structure. Additionally, the drive mechanism can include a drive member engaged with the threaded portion of the drive shaft and configured to be fixed to a second structure to facilitate translation relative to the threaded portion upon rotation of the drive shaft. An angle of misalignment of the bearing can compensate for drive shaft rotational misalignment. A position of the drive member can be adjustable upon assembly to compensate for drive axis translational misalignment.

Figure 1A:
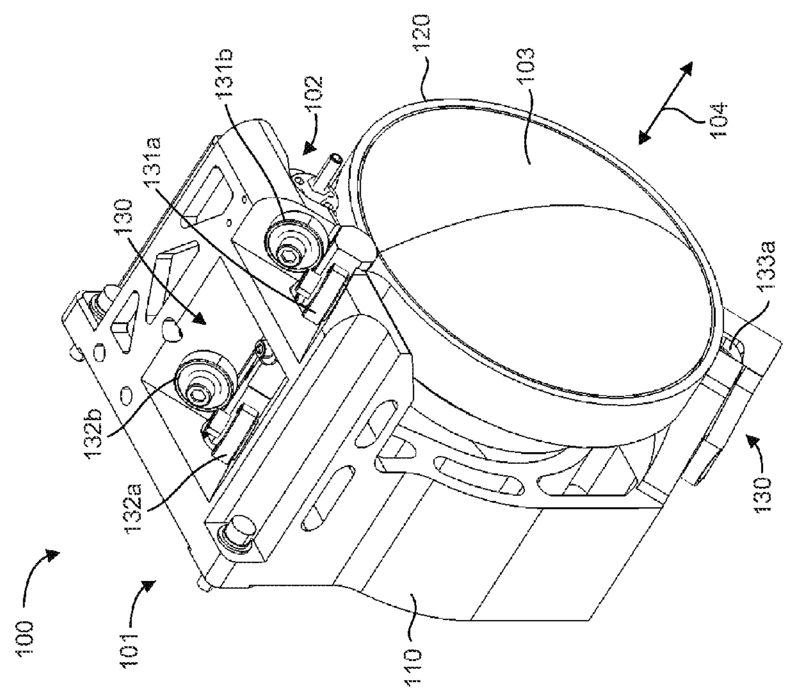

One example of a relative translation system 100 is illustrated in FIGS. 1A and 1B. The relative translation system 100 is shown configured as a focus cell, where an optical element 103, such as a lens, is supported and translatable in direction 104 to facilitate focusing electromagnetic radiation for an optical sensor (not shown), such as may be used in an aircraft optical assembly. Although a focus cell is shown and described throughout the present disclosure, it should be recognized that a focus cell is only one exemplary embodiment of a relative translation system. Accordingly, a relative translation system as disclosed herein may be of any suitable configuration and adapted for use in any suitable application, such as where precision translation is needed over a significant temperature variation and/or in a vibration environment. For example, a relative translation system may be used in high powered medical equipment, robotics, and applications for vehicles or equipment used in harsh environments.

The relative translation system 100 can comprise a relative translation assembly 101. The relative translation assembly can include a fixed support member 110, a translatable member 120 supported by the fixed support member 110, and a translation guide portion 130 to facilitate translation of the translatable member 120 relative to the fixed support member 110. The relative translation system 100 can also comprise a drive mechanism 102 configured to cause translation of the translatable member 120 relative to the fixed support member 110.

Figures 2A, 2B:
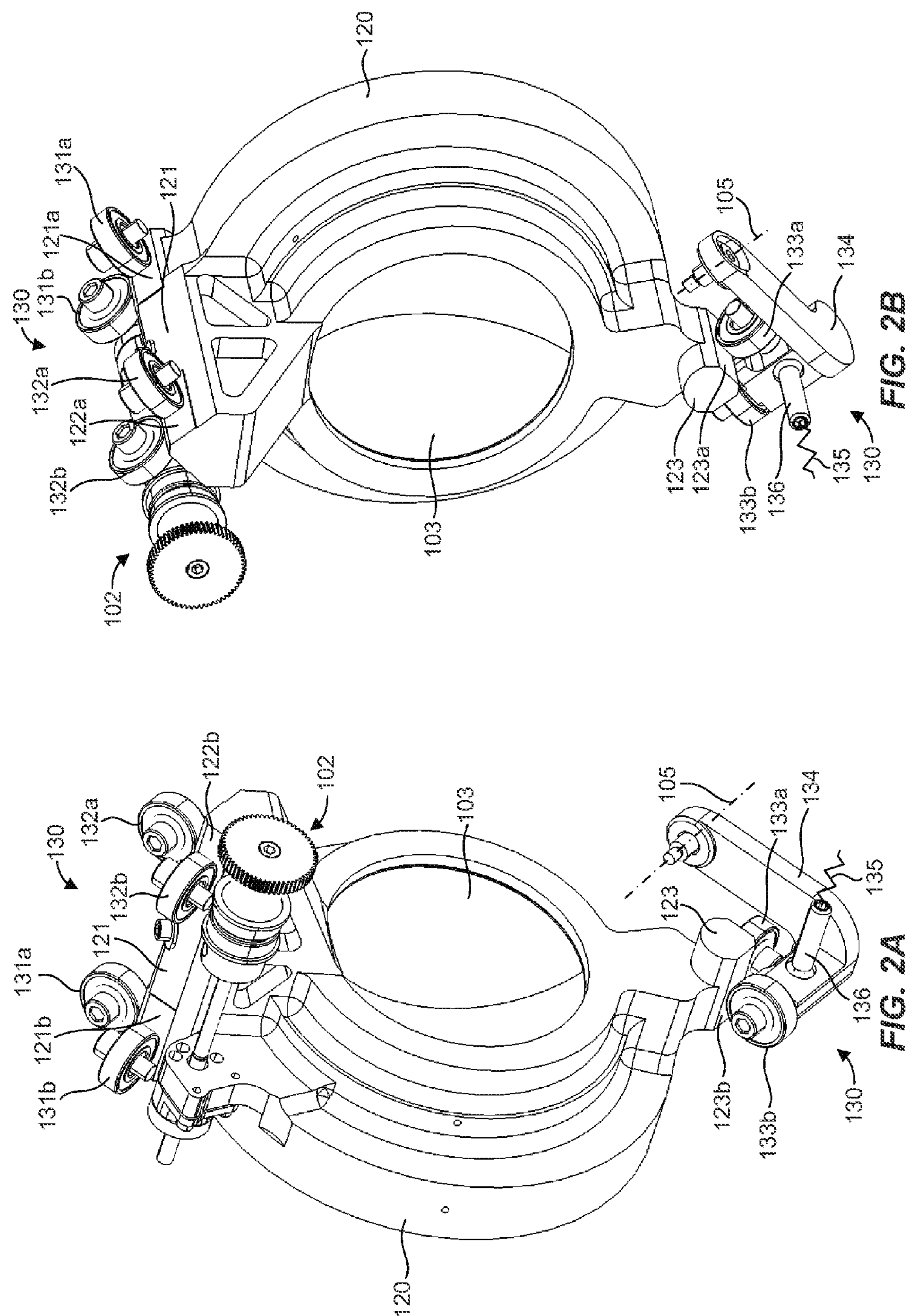
FIGS. 2A and 2B are example illustrations of the relative translation system of FIGS. 1A and 1B, with a fixed support member omitted for clarity.

With continued reference to FIGS. 1A and 15, FIGS. 2A and 25 illustrate aspects of the translation guide portion 130, with the fixed support member 110 omitted in FIGS. 2A and 25 for clarity. The translation guide portion 130 can have a fixed translation member 131*a*, 131*b*, 132*a*, 132*b*, 133*a* and a movable translation member 133*b*. The fixed translation member 131*a*, 131*b*, 132*a*, 132*b*, 133*a* can be coupled to, and supported by, the fixed support member 110. The movable translation member 133*b* can be movably supported by the fixed support member 110. In one aspect, the movable translation member 133*b* can be configured to rotate and/or translate relative to the fixed support member 110. For example, the movable translation member 133*b* can be coupled to a swing arm 134, which can be rotatably coupled to the fixed support member 110 to provide rotation about an axis 105.

The translation guide portion 130 can also include a translation member support 121, 123 with interface surfaces 121*a*, 121*b*, 122*a*, 122*b*, 123*a*, 123*b* configured to interface with the fixed and movable translation members 131*a*, 131*b*, 132*a*, 132*b*, 133*a*, 133*b*, respectively. The translation member support 121, 123 can be of any suitable configuration, such as a rail, track, guide, etc., and may be coupled to the translatable member 120 via a permanent coupling (i.e., integrally formed, or non-removably coupled with the translatable member 120) or a removable coupling. Alternatively, it should be recognized that a translation member support may be coupled to a fixed support member and that a translation member may be coupled to, and supported by, a translatable member. The fixed and movable translation members 131*a*, 131*b*, 132*a*, 132*b*, 133*a*, 133*b* and the interlace surfaces 121*a*, 121*b*, 122*a*, 122*b*, 123*a*, 123*b* can be configured for a rolling and/or sliding interface.

In one aspect, the translation guide portion 130 can provide adequate support and/or constraint of the translatable member 120 sufficient to facilitate translation of the translatable member 120 without utilizing the drive mechanism 102 for structural support and/or constraint of the translatable member 120. As a result, the drive mechanism 102 can serve purely as a means to exert a drive force to cause translation of the translatable member 120. The drive mechanism 102 can therefore be of any suitable type or configuration to cause translation of the translatable member 120, and can include an electric motor, a hydraulic ram, a pneumatic ram, a lead screw, a drive train, or any other linear drive mechanism or device that can cause translation of the translatable member 120. As described further hereinafter, separation of the drive mechanism 102 from structural support and/or constraint of the translatable member 120 can provide benefits to reliability, switching speed, motion precision over a long range of travel, and others.

In one aspect, the movable translation member 133*b* can be configured to maintain preload on the fixed and movable translation members 131*a*, 131*b*, 132*a*, 132*b*, 133*a*, 133*b*. For example, a spring 135 supported by the fixed support member 110 can provide a force to preload the fixed and movable translation members 131*a*, 131*b*, 132*a*, 132*b*, 133*a*, 133*b*, such as by acting on a pin or plunger 136 in contact with the swing arm 134. The movement of the movable translation member 133*b* can accommodate thermal expansion over a temperature range, such as thermal expansion of the translatable member 120, while maintaining preload on the fixed and movable translation members 131*a*, 131*b*, 132*a*, 132*b*, 133*a*, 133*b* without substantially increasing friction, load, or stress on the fixed and movable translation members.

The fixed and movable translation members 131*a*, 131*b*, 132*a*, 132*b*, 133*a*, 133*b* can be located or positioned in any suitable manner with respect to one another, the fixed support member 110, and/or the translatable member 120. For example, as illustrated, the fixed and movable translation members 131*a*, 131*b*, 132*a*, 132*b*, 133*a*, 133*b* can be arranged in pairs, with two pairs of fixed translation members 131*a-b*, 132*a-b* configured to interface with the translation member support 121, and a mixed pair of the fixed translation member and the movable translation member 133*a-b* configured to interface with the translation member support 123. This is one example of a translation member configuration that can provide adequate support and/or constraint of the translatable member 120. Such an arrangement or configuration can therefore provide a kinematic or semi-kinematic mounting scheme. In one aspect, one of the fixed translation members 131*a*, 131*b*, 132*a*, 132*b* can be omitted from the configuration illustrated to provide three points of contact with the translation member support 121 and preserve the same degree of constraint for the translatable member 120. In one example (not shown), a single fixed translation member can be configured to support and constrain a translatable member at a bottom end of the translatable member and a single movable translation member can be configured to support and constrain the translatable member at a top end of the translatable member.

Figure 3:
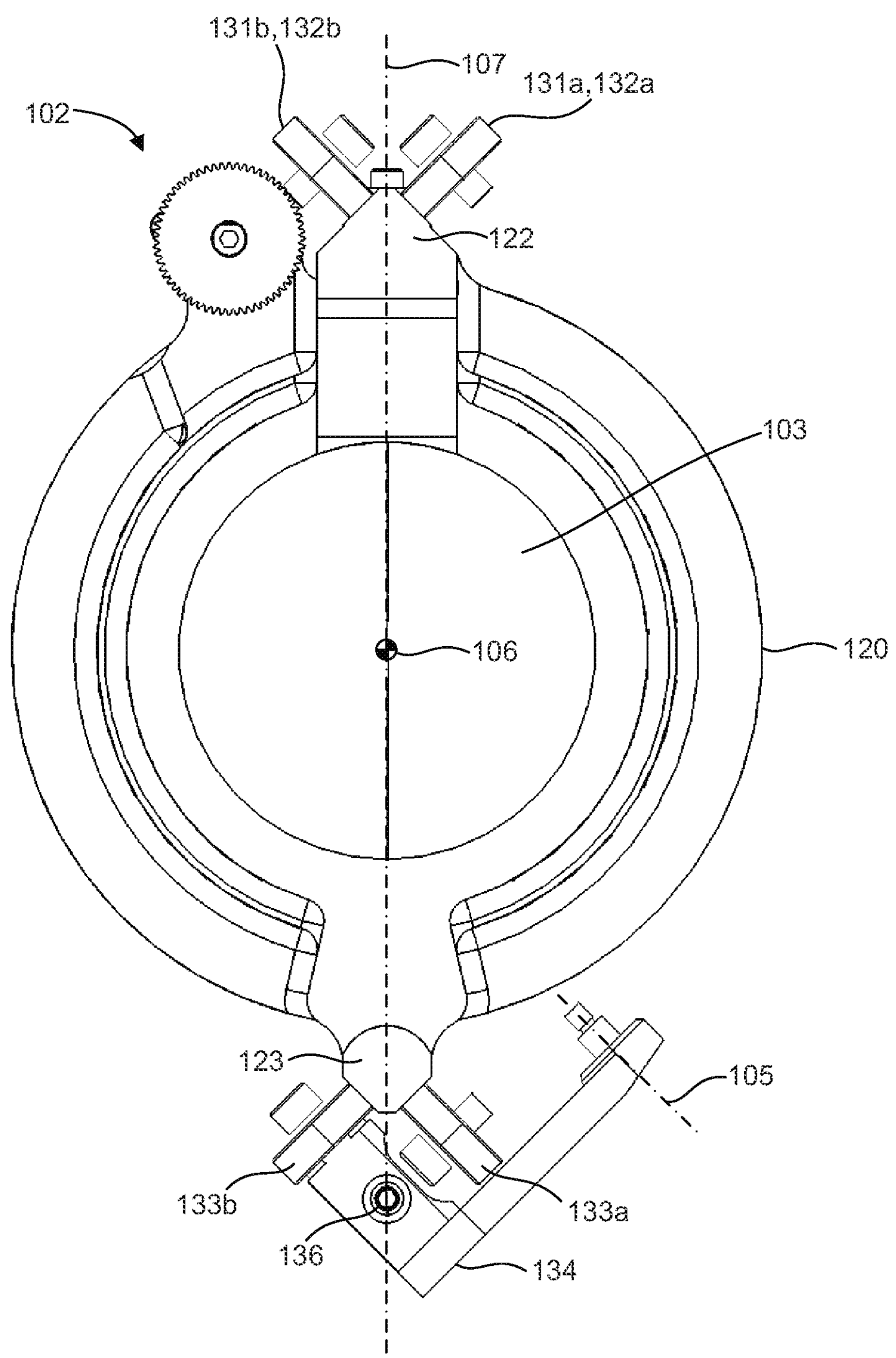
FIG. 3 is an end view of the relative translation system of FIGS. 2A and 2B.

As illustrated in FIG. 3, the translation member supports 121, 123, and associated fixed and movable translation members 131*a*, 131*b*, 132*a*, 132*b*, 133*a*, 133*b*, can be located diametrically opposite one another about a center of mass 106 of the translatable member 120 and attached structures (i.e., optical element 103). In other words, a plane 107 defined by the locations of the translation member supports 121, 123, and associated fixed and movable translation members 131*a*, 131*b*, 132*a*, 132*b*, 133*a*, 133*b*, can pass through the center of mass 106. In one aspect, the plane 107 can include an optical axis of the lens 103, in this case extending perpendicular to the view in FIG. 3 through the center of mass 106. In another aspect, the fixed and movable translation members 131*a*, 131*b*, 132*a*, 132*b*, 133*a*, 133*b* can interface with the translation member supports 121, 123 at a minimal distance from the center of mass 106. Such an arrangement or configuration can symmetrically support the translatable member 120 and attached structures about the center of mass 106 to minimize or reduce the moments created due to dynamic loading (i.e., vibrations), which can minimize or reduce jitter of the lens thereby improving performance. It should be recognized that an optical axis can be offset from the plane 107 or in any suitable orientation relative to the plane, such as to improve packaging efficiency and/or meet space constraints.

In one aspect, the fixed and movable translation members 131*a*, 131*b*, 132*a*, 132*b*, 133*a*, 133*b* can comprise one or more rollers, as illustrated in FIGS. 1A-3. A roller is any structure, feature, or device that rotates to facilitate relative translation of the translatable member 120 and the fixed member 110, typically of a cylindrical and/or spherical configuration, such as a wheel. Accordingly, the interface surfaces 121*a*, 121*b*, 122*a*, 122*b*, 123*a*, 123*b* can be configured to interface with rollers. In a particular aspect, an interface between a roller and an interface surface can be "line" contact, which can prevent or minimize yielding of the interface surface due to shock that can create localized depressions in the interface surface, thereby maintaining smooth motion and motion precision capabilities.

A roller can include a bearing, such as a ball bearing and/or a roller bearing, which can be configured as a radial and/or a thrust bearing. A bearing can have an angle of misalignment that is the maximum amount an inner bearing race can go off-axis relative to an outer bearing race. In one aspect, a bearing can have an angle of misalignment between inner and outer races that can serve to maintain line contact between a roller and an interface surface. For example, manufacturing tolerances can be selected such that the angle of misalignment can be sufficient to facilitate line contact between a roller and an interface surface upon assembly and maintained during operation. The bearings can therefore "self-align" to maintain line contact, which can preserve smooth motion and motion precision capabilities even after high loading events, such as shock.

In one aspect, the relative translation system 100 disclosed herein can be minimally affected by thermal expansion. For example, temperature variations can cause misalignment due to coefficient of thermal expansion (CTE) mismatch. With regard to a relative translation system in accordance with the present disclosure, the only CTE mismatch may be due to the thickness of the bearing inner and outer races, which are small thicknesses compared to other designs. In the case of a focus cell, this can minimize boresight drift or lens misalignment over a temperature range, which can substantially maintain lens position over the temperature range. The relative translation system 100 can thus provide consistent, reliable, and repeatable performance over a range of temperatures and when subjected to high (i.e., shock) loads.

Figure 4:
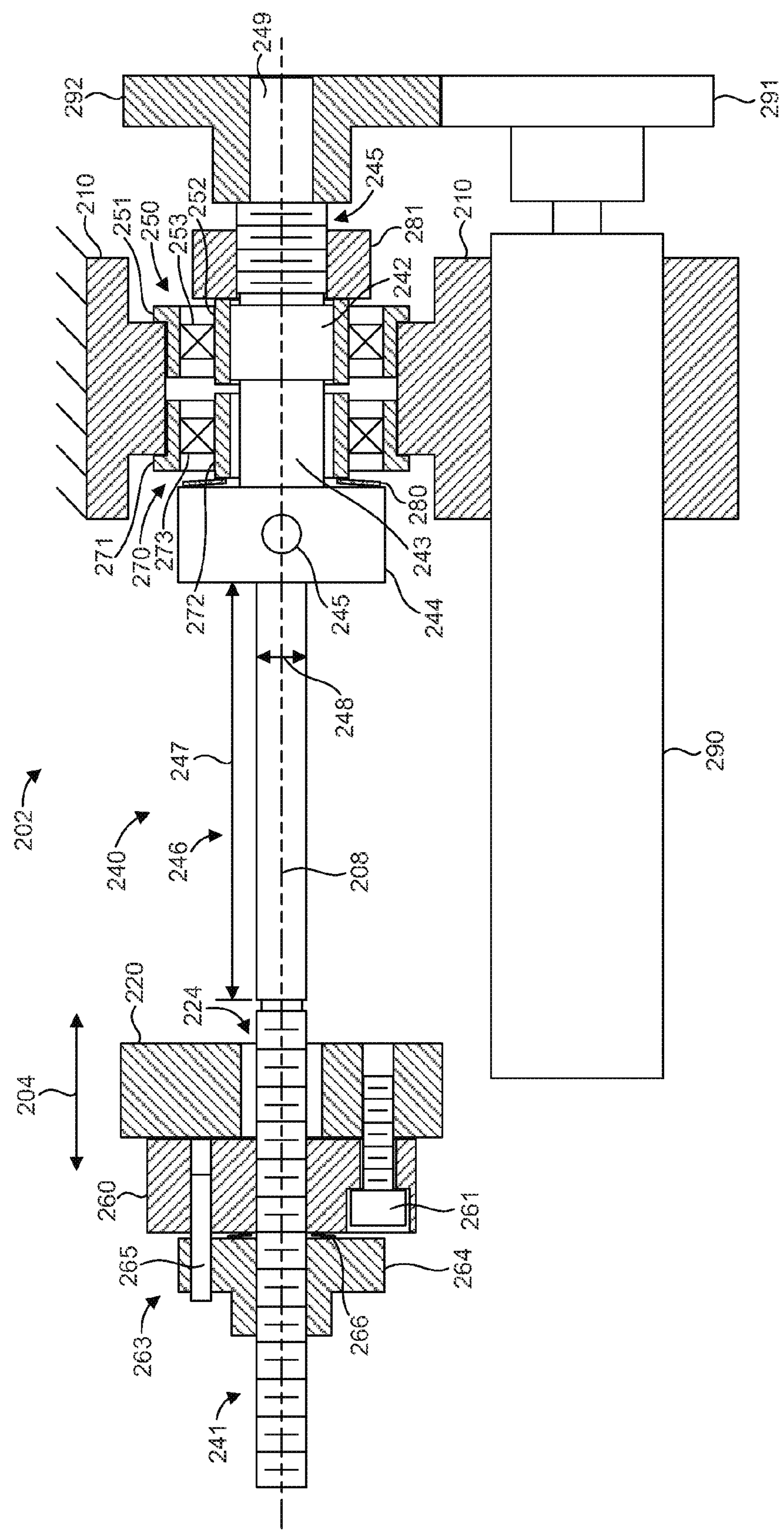
FIG. 4 is an example illustration of a drive mechanism in accordance with an example of the present disclosure.

FIG. 4 is a schematic illustration of a drive mechanism 202. The drive mechanism 202 can include a drive shaft 240 having a threaded portion 241. The drive mechanism 202 can also include a drive shaft support bearing 250 to facilitate rotation of the drive shaft 240 about a drive axis 208. The drive shaft support bearing 250 can be configured to support the drive shaft 240 and interface with a first structure 210, such as a fixed support structure of a relative translation system as disclosed above. For example, an outer race 251 of the drive shaft support bearing 250 can be configured to interface with the first structure 210 and an inner race 252 of the drive shaft support bearing 250 can be configured to interface with a locating portion 242 of the drive shaft 240. The locating portion 242 and the inner race 252 can interface with one another in an interference, clearance, or slip fit. In addition, the drive mechanism 202 can include a drive member 260 engaged with the threaded portion 241 of the drive shaft 240. The drive member 260 can be configured to be fixed to a second structure 220, such as a translatable member of a relative translation system as disclosed above, to facilitate translation relative to the threaded portion 241 upon rotation of the drive shaft 240. In other words, the interface of the drive member 260 and the threaded portion 241 can convert rotational motion of the drive shaft 240 about the drive axis 208 to linear motion of the drive member 260 in direction 204. Although the drive shaft support bearing 250 is illustrated as interfacing with a fixed structure and the drive member 260 is illustrated as being fixed to a movable structure, it should be recognized that the drive shaft support bearing 250 can interface with a movable structure and the drive member 260 can be fixed to a fixed structure.

In one aspect, a position of the drive member 260 can be adjustable upon assembly relative to the second structure 220 to compensate for drive axis translation tolerance or misalignment, which occurs when a drive axis does not "line up" with a translating member and may result due to manufacturing tolerances. To accommodate this, the second structure 220 can have an opening 224 to receive the drive shaft 240 that is sufficiently oversized to allow the drive member 260 to "float" for lateral adjustment and "centering" without interference between the drive shaft 240 and the second structure 220. After being centered, the drive member 260 can then be fixed to the second structure 220 via any suitable means, such as a fastener 261, pin, rivet, weld, etc. In this manner, compensation for "as-built" tolerances leading to misalignment of the drive axis 208 can occur at assembly. In another aspect, an angle of misalignment of the drive shaft support bearing 250 can compensate for angular misalignment or rotational tolerances of the drive shaft, which may result due to manufacturing tolerances, such as the roundness and/or non-concentricity of drive shaft 240 features and/or a perpendicularity tolerance of the first structure 210 to bearing 250 interface. The drive shaft 240 can therefore be prevented from binding or increased resistance with the drive member 260 due to misalignment and/or runout tolerances of the drive shaft 240, such as rotational and/or translational tolerances, by a one-time adjustment of the drive member 260 and taking advantage of the angular misalignment of the drive shaft support bearing 250. This can facilitate manufacture of the drive mechanism 202 with more relaxed tolerances than would otherwise be possible, which can reduce costs.

The drive mechanism 202 can also include a bearing 270 configured to interface with the first structure 210 proximate the drive shaft support bearing 250. For example, an outer race 271 of the bearing 270 can be configured to interface with the first structure 210. The bearing 270 can have a clearance or loose slip fit for the drive shaft 240 extending through an inner race 272 of the bearing 270. In one aspect, the drive shaft 240 can have a reduced diameter portion 243 to provide the clearance or loose slip fit with the bearing 270. Thus, the bearing 270 may have no contact with the drive shaft 240. The bearings 250, 270 can each have a rolling element 253, 273, respectively, which can comprise a bar, roller, or other suitable bearing rolling element. The bearings 250, 270 can also be configured as radial and/or thrust bearings.

In addition, the drive mechanism 202 can include a spring 280, such as a spring washer, configured to act on the inner race 272 of the bearing 270 to facilitate preload of the bearings 250, 270. For example, the drive shaft 240 can include a spring interface feature 244 to interface with the spring 280. The spring interface feature 244 can comprise a locally increased diameter portion of the drive shaft 240. A fastener 281, such as a nut, can be threaded onto a threaded feature 245 of the drive shaft 240 to preload the spring 280 and the bearings 250, 270. A tool interface feature 245, such as a hole, can be used to interface with a tool to resist rotation of the drive shaft while the fastener 281 is rotated to apply preload. The drive shaft support bearing 250 can therefore serve to locate and support the drive shaft 240 and the bearing 270 can serve to reduce rotating friction of the spring 280. The low friction provided by the bearing 270 for the spring 280 can provide performance benefits, such as repeatability of lens adjustment when the drive mechanism 202 is incorporated in a focus cell.

In one aspect, the drive shaft 240 can have a mid portion 246 configured to provide flexibility sufficient to accommodate a misalignment and/or runout tolerances of the drive shaft 240. For example, the mid portion 246 can have a length 247 and a diameter 248 configured to flex in response to forces tending to bind and/or increase friction of the threaded portion 241 and the drive member 260 while transferring torque sufficient to cause relative translation of the first and second structures 210, 220. The flexibility of the mid portion 246 can therefore compensate for any remaining problems due to part and/or assembly tolerances.

By preventing or minimizing any binding or increased friction between the drive shaft 240 and the drive member 260 due to misalignment or runout tolerances, the drive mechanism 202 can be configured to simply exert a drive force to cause translation of the second member 220 without providing any structural support for the second member 220. Thus, the second member 220 can be structurally supported and constrained for linear motion in direction 204 independent of the drive mechanism 202. This separation of the drive mechanism 202 from structural support and/or constraint of the second member 220 can provide benefits to reliability, switching speed, and motion precision over a long range of travel.

In one aspect, the drive mechanism 202 can include a backlash compensation mechanism 263. The backlash compensation mechanism 263 can comprise a nut 264 threaded onto the threaded portion 241 and coupled to the drive member 260 via a pin 265 or other suitable fastener. A spring 266 between the drive member 260 and the nut 264 can preload the nut 264. Threads of the nut 264 can cooperate with threads of the drive member 260 to remove backlash with the threads of the threaded portion 241.

In an alternate example (not shown), the backlash compensation mechanism 263, the bearing 270, and the spring interface feature 244 can be omitted. In this case, the spring 280 could contact and extend between the inner race 252 of the drive shaft support bearing 250 and the drive member 260, which could preload the drive member 260, as well as the drive shaft support bearing 250, to prevent or eliminate backlash between the threads of the drive member 260 and the threaded portion 241 of the drive shaft 240.

The drive mechanism 202 can also include a motor 290 coupled to the drive shaft 240. For example, the motor 290 can be coupled to the drive shaft 240 via a drive train comprising one or more gears 291, 292, a chain, a belt, and/or a pulley. The drive shaft 240 can include a drive interface portion 249 to facilitate coupling with the motor 290, such as by interfacing with the gear 292. The motor 290 can be an electric motor or any other suitable motor for imparting torque to the drive shaft 240. In one aspect, the motor 290 can be coupled to and supported by the first structure 210.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A relative translation system, comprising:

a relative translation assembly, having a fixed support member, a translatable member supported by the fixed support member, and a translation guide portion to facilitate translation of the translatable member relative to the fixed support member, the translation guide portion having a fixed translation member and a movable translation member, the movable translation member fixedly coupled to a swing arm, the swing arm rotatably coupled to the fixed support member to provide a rotation of the movable translation member about an axis, the fixed translation member and the movable translation member operate together to constrain movement of the translatable member in a translational degree of freedom, wherein, the movable translation member is configured to maintain preload on the fixed and movable translation members and accommodate thermal expansion; and a drive mechanism configured to cause translation of the translatable member relative to the fixed support member.

2. The system of claim 1, wherein the drive mechanism comprises:

a drive shaft having a threaded portion;

a first bearing to facilitate rotation of the drive shaft, the bearing being configured to support the drive shaft and interface with the fixed support member; and a drive member engaged with the threaded portion of the drive shaft and configured to be fixed to the translatable member to facilitate translation relative to the threaded portion upon rotation of the drive shaft, wherein an angle of misalignment of the bearing compensates for drive shaft rotational misalignment, and wherein a position of the drive member is adjustable upon assembly to compensate for drive axis translational misalignment.

3. The system of claim 2, further comprising a backlash compensation mechanism.

4. The system of claim 3, wherein the backlash compensation mechanism comprises a nut coupled to the drive member.

5. The system of claim 2, wherein the bearing comprises a ball bearing, a roller bearing, a radial bearing, a thrust bearing, or combinations thereof.

6. The system of claim 2, further comprising:

a second bearing configured to interface with the fixed support member the first bearing, the second bearing having clearance for the drive shaft extending therethrough; and a spring configured to act on an inner race of the second bearing to facilitate preload of the first and second bearings.

7. The system of claim 6, wherein the drive shaft comprises a spring interface feature to interface with the spring.

8. The system of claim 2, wherein the drive shaft comprises a mid portion configured to provide flexibility sufficient to accommodate a misalignment of the drive shaft.

9. The system of claim 2, further comprising a motor coupled to the drive shaft.

10. The system of claim 9, wherein the motor is coupled to the drive shaft via a drive train.

11. The system of claim 10, wherein the drive train comprises a gear, a chain, a belt, a pulley, or combinations thereof.

12. The system of claim 1, further comprising a spring to provide preload.

13. The system of claim 1, wherein the movable translation member is movably supported by the fixed support member.

14. The system of claim 1, wherein the movable translation member is at least one of rotatably supported and translatably supported by the fixed support member.

15. The system of claim 1, further comprising a plurality of fixed translation members, wherein at least one of the fixed translation members and the movable translation member comprise a roller.

16. The system of claim 15, wherein at least one of the fixed translation members and the movable translation member comprises a bearing.

17. The system of claim 15, wherein the translation guide portion comprises a roller interface to interface with the roller.

* * * * *